(12) United States Patent
Ramian

(10) Patent No.: US 12,540,970 B2
(45) Date of Patent: Feb. 3, 2026

(54) SIGNAL PROCESSING METHOD AND MEASUREMENT SYSTEM

(71) Applicant: Rohde & Schwarz GmbH & Co. KG, Munich (DE)

(72) Inventor: Florian Ramian, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 146 days.

(21) Appl. No.: 18/626,698

(22) Filed: Apr. 4, 2024

(65) Prior Publication Data

US 2024/0410941 A1 Dec. 12, 2024

(30) Foreign Application Priority Data

Jun. 12, 2023 (EP) ..................................... 23178722

(51) Int. Cl.
*G01R 31/3167* (2006.01)
(52) U.S. Cl.
CPC ................ *G01R 31/3167* (2013.01)
(58) Field of Classification Search
CPC .............. G01R 31/3167; G01R 13/029; G01R 19/0053; G01R 29/26; G01R 31/00; H03K 5/1252
See application file for complete search history.

(56) References Cited

U.S. PATENT DOCUMENTS

| | | | |
|---|---|---|---|
| 11,095,376 B1 | 8/2021 | Iwai et al. | |
| 11,595,137 B1 | 2/2023 | Mohindra | |
| 2013/0197848 A1 | 8/2013 | Sariaslani et al. | |
| 2017/0168104 A1* | 6/2017 | Lin | G01R 29/26 |
| 2023/0003782 A1* | 1/2023 | Iwai | G01R 29/26 |
| 2023/0280373 A1* | 9/2023 | Ramian | G01R 29/26 |
| | | | 324/76.39 |

* cited by examiner

Primary Examiner — Giovanni Astacio-Oquendo
(74) Attorney, Agent, or Firm — CHRISTENSEN O'CONNOR JOHNSON KINDNESS PLLC

(57) ABSTRACT

A signal processing method includes the steps of: receiving, by a first measurement circuit, an analog measurement signal from a device under test; digitizing, by the first measurement circuit, the analog measurement signal, thereby obtaining a digital measurement signal; removing, by a first noise reduction circuit, noise from the digital measurement signal, thereby obtaining a noise-corrected measurement signal; receiving, by a second measurement circuit, an analog reference signal, wherein the device under test generates the analog measurement signal based on the analog reference signal; digitizing, by the second measurement circuit, the analog reference signal, thereby obtaining a digital reference signal; removing, by a second noise reduction circuit, noise from the digital reference signal, thereby obtaining a noise-corrected reference signal; and determining, by a subtraction circuit, a digital difference signal based on the noise-corrected measurement signal and based on the noise-corrected reference signal. Further, a measurement system is described.

17 Claims, 2 Drawing Sheets

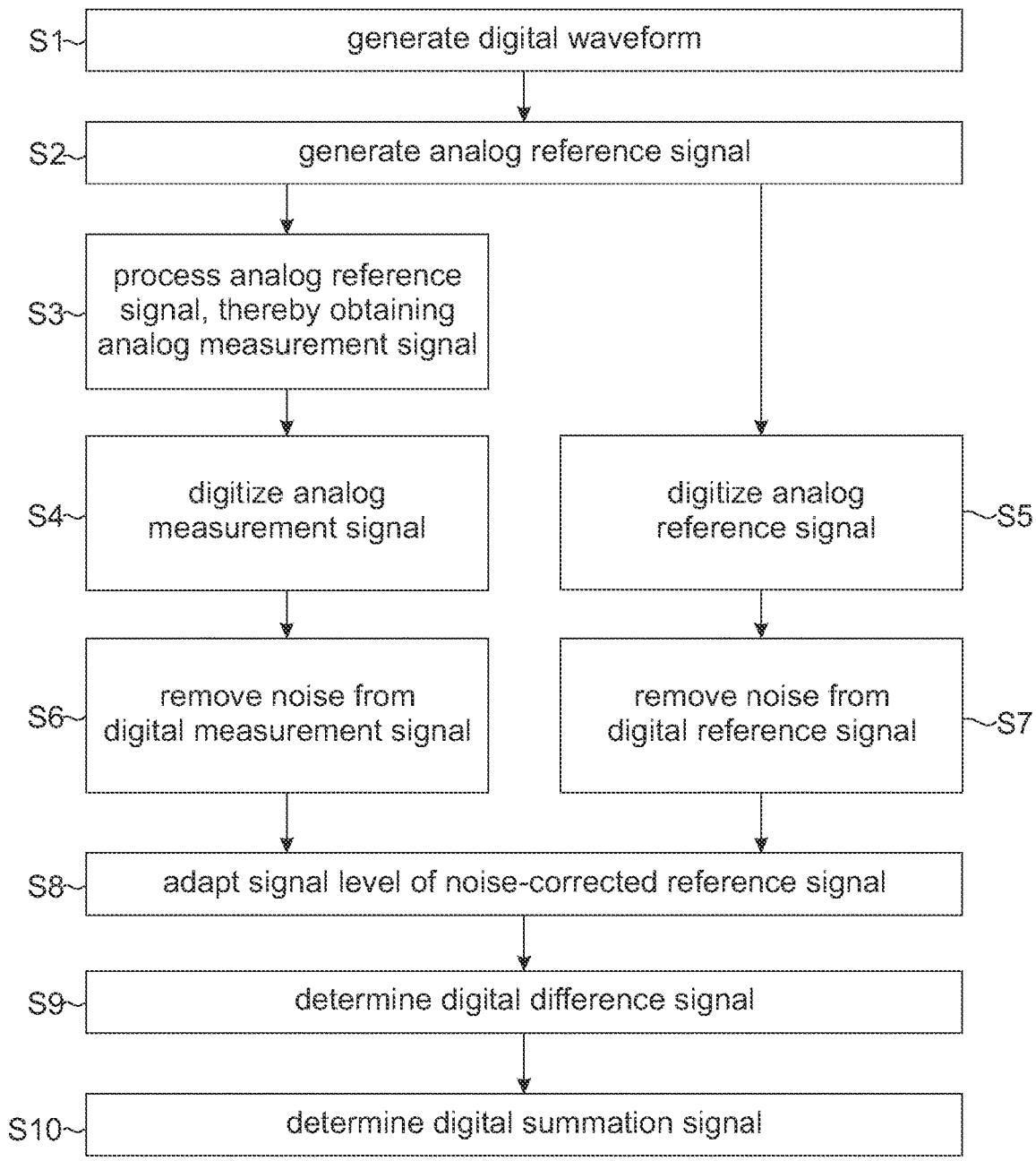

SIGNAL PROCESSING METHOD AND MEASUREMENT SYSTEM

FIELD OF THE DISCLOSURE

Embodiments of the present disclosure generally relate to a signal processing method for reducing measurement uncertainties. Embodiments of the present disclosure further relate to a measurement system.

BACKGROUND

For high-precision measurements performed on a device under test by a measurement instrument, it is important to remove noise generated by sources other than the device under test. For example, noise generated by a signal generator providing a test signal to the device under test and noise generated by the measurement instrument itself need to be taken into account.

There are different techniques known in the art that remove noise generated by sources other than the device under test. However, there is a need for a signal processing method and a measurement system that further improve the noise cancelation of noise generated by sources other than the device under test.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a signal processing method for reducing measurement uncertainties. In an embodiment, the signal processing method comprises:

receiving, by a first measurement circuit, an analog measurement signal from a device under test;

digitizing, by the first measurement circuit, the analog measurement signal, thereby obtaining a digital measurement signal;

removing, by a first noise reduction circuit, noise from the digital measurement signal, thereby obtaining a noise-corrected measurement signal;

receiving, by a second measurement circuit, an analog reference signal, wherein the device under test generates the analog measurement signal based on the analog reference signal;

digitizing, by the second measurement circuit, the analog reference signal, thereby obtaining a digital reference signal;

removing, by a second noise reduction circuit, noise from the digital reference signal, thereby obtaining a noise-corrected reference signal; and determining, by a subtraction circuit, a digital difference signal based on the noise-corrected measurement signal and based on the noise-corrected reference signal.

Therein and in the following, the term "the device under test generates the analog measurement signal based on the analog reference signal" is understood to denote that the device under test may process and output the analog reference signal generated by an external signal generator. Alternatively, this term may denote that the device under test processes and outputs the analog reference signal generated by a signal generator that is integrated into the device under test.

Further, the term "removing noise" is understood to denote that noise originating in the first measurement circuit and/or in the second measurement circuit is removed. Therein, any suitable noise-cancellation technique may be used in order to remove the noise, as will be described in more detail below.

The noise-corrected measurement signal comprises noise generated by the device under test as well as noise generated by a signal generator generating the analog reference signal. On the other hand, the noise-corrected reference signal comprises noise generated by the signal generator generating the analog reference signal. In an embodiment, the noise included in the noise-corrected reference signal is solely generated by the signal generator generating the analog reference signal. Thus, when determining the difference signal, the noise generated by the signal generator cancels.

As a result, the resulting signal, i.e. the digital difference signal, comprises only noise generated by the device under test, for example statistical noise generated by the device under test and noise due that originates from defects of the device under test.

In an embodiment, the digital difference signal may only comprise noise generated by the device under test, i.e. no other signal components. In other words, the digital difference signal corresponds to a DUT-specific error comprised in the digital measurement signal.

Thus, a performance of the device under test may be assessed based on digital difference signal. For instance, the noise generated by the device under test may be analyzed based on the digital difference signal comprising only the noise generated by the device under test. For example, the noise contribution of the device under test may be analyzed over frequency.

Thus, the signal processing method according to embodiments of the present disclosure further reduces measurement uncertainties relating to noise generated by sources other than the device under test. Accordingly, the signal processing method according to embodiments of the present disclosure allows for assessment of the performance of the device under test with high precision, as an advanced noise cancelation of noise originating in all other sources is provided. Consequently, additional measurement uncertainty is removed, which may originate from frequency response or non-linearities not caused by the device under test.

According to an aspect of the present disclosure, a signal level of the noise-corrected measurement signal and/or a signal level of the noise-corrected reference signal are/is adapted, for example, before determining the digital difference signal. By adapting the signal level of the noise-corrected measurement signal and/or the signal level of the noise-corrected reference signal, it is ensured that noise originating outside of the device under test cancels. In an embodiment, it is ensured that noise originating outside of the device under test cancels completely.

In an embodiment of the present disclosure, the signal level of the noise-corrected measurement signal and/or of the noise-corrected reference signal are/is adapted such that the noise-corrected measurement signal and the noise-corrected reference signal have a substantially equal signal level, for example an equal signal level. By adapting the signal level of the noise-corrected measurement signal and/or the signal level of the noise-corrected reference signal this way, it is ensured that noise originating outside of the device under test cancels completely.

Therein, the term "substantially equal" is understood to denote that the signal levels are within 5% of each other, for example within 2% of each other.

According to a further aspect of the present disclosure, the analog reference signal is generated, for example, based on a digital waveform. The digital waveform may be provided by a digital waveform generator.

In general, the digital waveform corresponds to a waveform that is to be applied to the device under test in order to assess the performance of the device under test.

In a further embodiment of the present disclosure, the digital waveform is forwarded to the first noise reduction circuit and/or to the second noise reduction circuit, wherein the noise is removed from the digital measurement signal and/or from the digital reference signal based on the digital waveform. This way, it is ensured that portions of the digital measurement signal and/or of the digital reference signal corresponding to the digital waveform are not removed when removing the noise.

Another aspect of the present disclosure provides that the digital waveform comprises, for example, a modulated signal and/or a continuous wave signal sweep. In an embodiment, the digital waveform may correspond to an IQ data signal.

In an embodiment, the digital difference signal and the digital waveform are summed by a summation circuit, thereby obtaining a digital summation signal. The resulting signal, i.e. the digital summation signal, comprises only the digital waveform and noise originating in the device under test.

According to another aspect the digital summation signal is provided, for example, to a measurement application.

In an embodiment, a performance of the device under test may be assessed based on the digital summation signal. For instance, the noise generated by the device under test may be analyzed, for example by the measurement application, based on the digital summation signal comprising only the noise originating in the device under test and the digital waveform. For example, the noise contribution of the device under test may be analyzed over frequency based on the digital summation signal.

In a further embodiment of the present disclosure, an impedance mismatch between a signal generator generating the analog reference signal and the device under test is corrected. Thus, unwanted reflections at an input port of the device under test are reduced, for example avoided. Therein, any suitable impedance-matching technique known in the state of the art may be used in order to correct the impedance mismatch.

Alternatively or additionally, an impedance mismatch between a signal generator generating the analog reference signal and the second measurement circuit is corrected. Thus, unwanted reflections at the second measurement circuit are reduced, for example avoided. Therein, any suitable impedance-matching technique known in the state of the art may be used in order to correct the impedance mismatch.

Embodiments of the present disclosure further provide a measurement system. In an embodiment, the measurement system comprises a first measurement circuit, a second measurement circuit, a first noise reduction circuit, a second noise-reduction circuit, and a subtraction circuit. The measurement system is configured to perform any one (or all) of embodiments of the signal processing method described above.

Regarding the further advantages and properties of the measurement system, reference is made to the explanations given above with respect to the signal processing method, which also hold for the measurement system and vice versa.

In an embodiment of the present disclosure, the first measurement circuit, the second measurement circuit, the first noise reduction circuit, the second noise reduction circuit, and the subtraction circuit are integrated into a measurement instrument.

According to an aspect of the present disclosure, the measurement instrument, for example, is established as an oscilloscope, as a digital oscilloscope, as a signal analyzer, as vector network analyzer, or as a measurement receiver. However, it is to be understood that the measurement instrument may be established as any other suitable type of measurement instrument.

In an embodiment, the measurement system may further comprise an external signal generator, wherein the external signal generator is configured to generate the analog reference signal, for example based on a digital waveform. Therein and in the following, the term "external" is understood to denote that the signal generator is established separately from the measurement instrument. However, it is also conceivable that the signal generator is integrated into the measurement instrument.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3 shows an example flow chart of a signal processing method according to an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
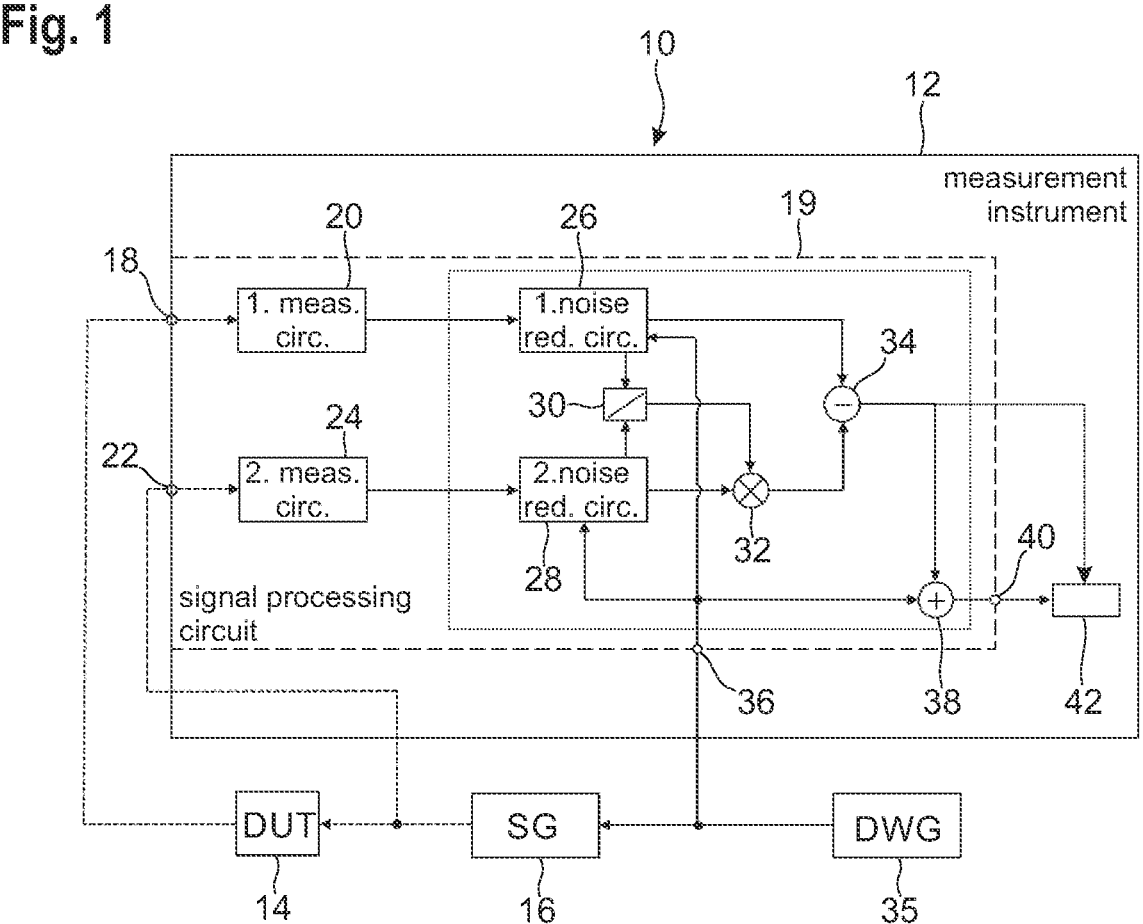
FIG. 1 schematically shows measurement system according to an embodiment of the present disclosure.

FIG. 1 shows a representative measurement system 10 comprising a measurement instrument 12 and a device under test 14. In general, the measurement instrument 12 is configured to perform measurements on the device under test 14, for instance on electric signals received from the device under test 14.

The device under test 14 may be any type of electronic device being configured to generate and/or process analog electric signals. For example, the device under test 14 may be an amplifier, a mixer, a filter, a mobile phone, or any other electronic component or device being configured to generate and/or process an electric signal.

In the example shown in FIG. 1, the device under test 14 is a two-port device that is configured to receive an analog signal from a signal generator 16. The device under test 14 processes the analog signal, thereby generating an analog measurement signal that is forwarded to the measurement instrument 12. However, it is to be understood that the device under test 14 may also be configured to generate the measurement signal.

In this embodiment, the signal generator 16 may be integrated into the device under test 14. However, in other embodiments the signal generator 16 may be integrated into the measurement instrument 12.

In general, the type of the measurement instrument 12 may depend on the type of the device under test 14 to be tested. For example, the measurement instrument 12 may be established as an oscilloscope for example as a digital oscilloscope, as a signal analyzer, as a vector network analyzer, or as a measurement receiver. However, it is to be understood that the measurement instrument 12 may be established as any other suitable type of measurement instrument.

In the embodiment of FIG. 1, The measurement instrument 12 comprises a first measurement port 18 and a signal processing circuit 19 with a first measurement circuit 20, wherein the first measurement circuit 20 is connected with an output of the device under test 14 via the first measurement port 18. The measurement instrument 12 further comprises a second measurement port 22 being connected with an output of the signal generator 16.

The signal processing circuit 19 comprises a second measurement circuit 24, wherein the second measurement circuit 24 is connected with the output of the signal generator 16 via the second measurement port 22. The signal processing circuit 19 also comprises a first noise reduction circuit 26 that is provided downstream of the first measurement circuit 20 and a second noise reduction circuit 28 that is provided downstream of the second measurement circuit 24. Interconnected between the first noise reduction circuit 26 and the second noise reduction circuit 28, a gain circuit 30 (optional) is provided.

In the embodiment shown in FIG. 1, a multiplication circuit 32 is provided that is connected to the second noise reduction circuit 28 downstream of the second noise reduction circuit 28, and that is connected to the gain circuit 30 downstream of the gain circuit 30.

The measurement instrument 12 may further comprise a subtraction circuit 34 that is provided downstream of the first noise reduction circuit 26 and downstream of the multiplication circuit 32. The measurement system 10 may further comprise a digital waveform generator (DWG) 35, which may be established separately from the signal generator 16.

In this case, the signal generator 16 may be connected with the digital waveform generator 35 so as to receive a digital waveform generated by the digital waveform generator 35. However, it is also conceivable that the digital waveform generator 35 may be integrated into the signal generator 16 or into the measurement instrument 12.

In the embodiment shown, the signal processing circuit 19 may further comprise a digital waveform input 36 that is connected to the digital waveform generator 35, e.g. via an additional input port of the measurement instrument 12. The first noise reduction circuit 26 and the second noise reduction circuit 28 may be connected to the digital waveform input 36 so as to receive the digital waveform generated by the digital waveform generator 35.

The measurement instrument 12 may further comprise a summation circuit 38 being connected to the subtraction circuit 34 downstream of the subtraction circuit 34 as well as being connected to the digital waveform input 36 so as to receive the digital waveform generated by the digital waveform generator 35.

The signal processing circuit 19 may further comprise a signal output 40 that is connected to a measurement circuit 42. For example, the measurement circuit 42 may be configured to execute a measurement application configured to analyze an output signal of the device under test 14 processed by the signal processing circuit 19.

The functionality of the individual circuits and the other components of the measurement system 10 will be described in more detail below.

Figure 2:
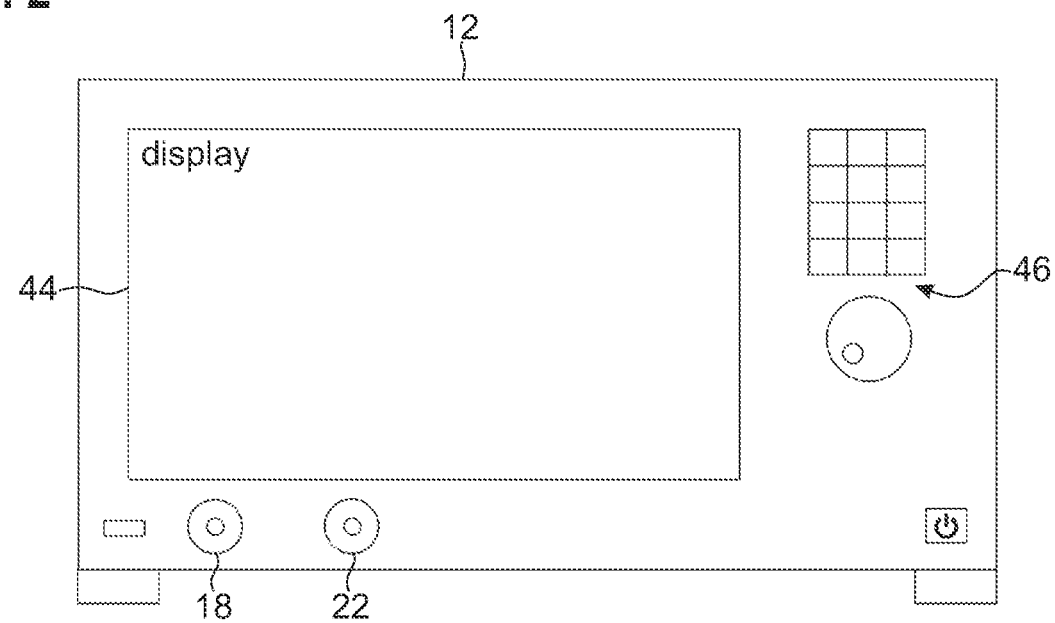
FIG. 2 shows a front view of an example measurement instrument of the measurement system of FIG. 1.

FIG. 2 shows a front view of the measurement instrument 12. As is illustrated in FIG. 2, the measurement instrument 12 may comprise a display 44 that is configured to display a user interface and/or measurement data obtained by the measurement instrument 12. The measurement instrument 12 may further comprise input means 46, e.g. buttons, a knob, a touch-sensitive display, etc. In general, a user may control measurement settings of the measurement instrument 12 and/or may adjust the visualization of data on the display 44 via the input means 46.

The measurement system 10 is configured to perform a signal processing method, an example of which is described in the following with reference to FIG. 3.

A digital waveform is generated by the digital waveform generator 35 (step S1).

In general, the digital waveform corresponds to a signal that is to be applied to the device under test 14 in order to test the device under test 14, i.e. in order to assess a performance of the device under test 14. For example, the digital waveform comprises a modulated signal and/or a continuous wave signal sweep. In an embodiment, the digital waveform may correspond to an IQ data signal.

It is noted that in FIG. 1, digital signals are denoted by solid arrows, while analog signals are denoted by dashed arrows.

The digital waveform is forwarded to the signal generator 16, to the first noise reduction circuit 26, and to the second noise reduction circuit 28. An analog reference signal is generated by the signal generator 16 based on the digital waveform (step S2).

The analog reference signal is forwarded to the device under test 14 and to the second measurement circuit 24. Therein, an impedance mismatch between the signal generator 16 and the device under test 14 may be corrected for by the signal generator 16 in order to minimize reflections at an input port od the device under test 14. Alternatively or additionally, an impedance mismatch between the signal generator 16 and the second measurement circuit 24 may be corrected for by the signal generator 16 in order to minimize reflections at the second measurement port 22 of the measurement instrument 12.

The analog reference signal is processed by the device under test 14, thereby obtaining an analog measurement signal (step S3).

The analog measurement signal is forwarded to the first measurement circuit 20. The analog measurement signal is digitized by the first measurement circuit 20, thereby obtaining a digital measurement signal (step S4).

Accordingly, the first measurement circuit 20 may comprise at least one analog-to-digital converter being configured to digitize the analog measurement signal.

The analog reference signal is digitized by the second measurement circuit 24, thereby obtaining a digital reference signal (step S5).

Accordingly, the second measurement circuit 24 may comprise at least one analog-to-digital converter being configured to digitize the analog reference signal.

Noise is removed from the digital measurement signal by the first noise reduction circuit 26, thereby obtaining a noise-corrected measurement signal (step S6).

In an embodiment, the noise is removed from the digital measurement signal based on the digital waveform provided by the digital waveform generator 35. The removed noise may correspond to noise generated by the measurement instrument 12, for example by the first measurement circuit 20.

Herein, any suitable noise-cancellation technique may be used in order to remove the noise from the digital measurement signal. In a certain example embodiment, the noise may be removed as follows:

A DUT noise contribution of the device under test 14 to the digital measurement signal is determined. The DUT noise contribution corresponds to noise originating in the device under test 14. The DUT noise contribution may be determined by any suitable technique, for example by any suitable technique known from the state of the art. For example, the techniques described in granted U.S. Pat. No. 10,761,134 B2, which is incorporated by reference in its entirety, may be used in order to determine the DUT noise contribution.

Based on the determined DUT noise contribution and based on the digital waveform, a noise level of the digital measurement signal is reduced to a noise level of the DUT noise contribution, thereby obtaining the noise-corrected measurement signal. Accordingly, the noise-corrected measurement signal comprises noise generated by the device under test 14 and noise generated by the signal generator 16, as the noise generated by the measurement instrument 12 has been removed.

Noise is removed from the digital reference signal by the second noise reduction circuit 28, thereby obtaining a noise-corrected reference signal (step S7).

In an embodiment, the noise is removed from the digital reference signal based on the digital waveform provided by the digital waveform generator 35. The removed noise may correspond to noise generated by the measurement instrument 12, for example by the second measurement circuit 24.

Any suitable noise-cancellation technique may be used in order to remove the noise from the digital reference signal. For example, the noise may be removed analogously to step S7 described above, wherein the DUT noise contribution is replaced by a noise contribution of the signal generator 16 (in other words, the signal generator 16 corresponds to the DUT). Accordingly, the noise-corrected reference signal comprises noise generated by the signal generator 16, as the noise generated by the measurement instrument 12 has been removed.

A signal level of the noise-corrected reference signal is adapted by the gain circuit 30 and by the multiplication circuit 32 (step S8).

For example, the signal level of the noise-corrected reference signal is adapted such that the noise-corrected measurement signal and the noise-corrected reference signal have a substantially equal signal level, for example an equal signal level.

The gain circuit 30 may determine a signal level $g_1$ of the noise-corrected measurement signal and a signal level $g_2$ of the noise-corrected reference signal. The gain circuit 30 may determine a gain factor G based on the determined signal levels $g_1$, $g_2$ according to $G=g_1/g_2$.

The signal level of the noise-corrected reference signal may then be adapted by the multiplication circuit 32 by multiplying the noise-corrected reference signal with the gain factor G. Of course, it is also possible to adapt the signal level of the noise-corrected measurement signal instead.

In this case, the signal level of the noise-corrected measurement signal may be adapted by the multiplication circuit 32 by multiplying the noise-corrected measurement signal with the gain factor $G'=g_2/g_1$.

After adapting the signal level, the noise-corrected measurement signal and the noise-corrected reference signal are forwarded to the subtraction circuit 34. A digital difference signal is determined by the subtraction circuit 34 based on the noise-corrected measurement signal and based on the noise-corrected reference signal (step S9).

For instance, the subtraction circuit 34 may subtract the noise-corrected reference signal from the noise-corrected measurement signal, thereby obtaining the digital difference signal. Alternatively, the subtraction circuit 34 may subtract the noise-corrected measurement signal from the noise-corrected reference signal, thereby obtaining the digital difference signal.

As already mentioned above, the noise-corrected measurement signal comprises noise generated by the device under test 14 and noise generated by the signal generator 16, while the noise-corrected reference signal comprises noise generated by the signal generator 16. Thus, in the digital difference signal, the noise generated by the signal generator 16 cancels, such that the digital difference signal comprises only the noise generated by the device under test 14.

In an embodiment, as both the noise-corrected measurement signal and the noise-corrected reference signal comprise the digital waveform (and due to adapting the signal level of the noise-corrected reference signal and/or of the noise-corrected measurement signal), the digital waveform may cancel as well. Thus, the digital difference signal may only comprise noise generated by the device under test 14.

As indicated by the dotted arrow in FIG. 1, the digital difference signal may be forwarded to the measurement circuit 42 for analysis of the noise generated by the device under test 14, for example for assessing the performance of the device under test 14.

Further, the digital difference signal and the digital waveform may be summed by the summation circuit 38, thereby obtaining a digital summation signal (step S10).

The digital summation signal corresponds to the digital waveform, superposed with the noise generated by the device under test 14. The digital summation signal may be forwarded to the measurement circuit 42 for analysis of the noise generated by the device under test 14, for example for assessing the performance of the device under test 14.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer-readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Of course, in an embodiment, two or more of these components, or parts thereof, can be integrated or share hardware and/or software, circuitry, etc. In an embodiment, these components, or parts thereof, may be grouped in a single location or distributed over a wide area. In circumstances where the components are distributed, the components are accessible to each other via communication links.

In an embodiments, one or more of the components, such as the measurement instrument 12, the DUT 12, the signal generator 16, the digital waveform generator 35, etc., referenced above include circuitry programmed to carry out one or more steps of any of the methods disclosed herein. In an embodiments, one or more computer-readable media associated with or accessible by such circuitry contains computer readable instructions embodied thereon that, when executed by such circuitry, cause the component or circuitry to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, computer instructions, and/or similar terms used herein interchangeably).

In an embodiment, computer-readable media is any medium that stores computer readable instructions, or other information non-transitorily and is directly or indirectly accessible to a computing device, such as processor circuitry, etc., or other circuitry disclosed herein, etc. In other words, a computer-readable medium is a non-transitory memory at which one or more computing devices can access instructions, codes, data, or other information. As a nonlimiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal processing method for reducing measurement uncertainties, the signal processing method comprising the steps of:
    receiving, by a first measurement circuit, an analog measurement signal from a device under test;
    digitizing, by the first measurement circuit, the analog measurement signal, thereby obtaining a digital measurement signal;
    removing, by a first noise reduction circuit, noise from the digital measurement signal, thereby obtaining a noise-corrected measurement signal;
    receiving, by a second measurement circuit, an analog reference signal, wherein the device under test generates the analog measurement signal based on the analog reference signal;
    digitizing, by the second measurement circuit, the analog reference signal, thereby obtaining a digital reference signal;
    removing, by a second noise reduction circuit, noise from the digital reference signal, thereby obtaining a noise-corrected reference signal; and
    determining, by a subtraction circuit, a digital difference signal based on the noise-corrected measurement signal and based on the noise-corrected reference signal.

2. The signal processing method of claim 1, wherein a signal level of the noise-corrected measurement signal and/or a signal level of the noise-corrected reference signal are/is adapted before determining the digital difference signal.

3. The signal processing method of claim 2, wherein the signal level of the noise-corrected measurement signal and/or of the noise-corrected reference signal are/is adapted such that the noise-corrected measurement signal and the noise-corrected reference signal have a substantially equal signal level.

4. The signal processing method of claim 3, wherein the signal level of the noise-corrected measurement signal and/or of the noise-corrected reference signal are/is adapted such that the noise-corrected measurement signal and the noise-corrected reference signal have an equal signal level.

5. The signal processing method according to claim 1, wherein the analog reference signal is generated based on a digital waveform.

6. The signal processing method according to claim 5, wherein the digital waveform is forwarded to the first noise reduction circuit and/or to the second noise reduction circuit, and wherein the noise is removed from the digital measurement signal and/or from the digital reference signal based on the digital waveform.

7. The signal processing method according to claim 5, wherein the digital waveform comprises a modulated signal and/or a continuous wave signal sweep.

8. The signal processing method according to claim 5, wherein the digital difference signal and the digital waveform are summed by a summation circuit, thereby obtaining a digital summation signal.

9. The signal processing method according to claim 8, wherein the digital summation signal is provided to a measurement application.

10. The signal processing method according to claim 8, wherein a performance of the device under test is assessed based on the digital summation signal.

11. The signal processing method according to claim 1, wherein an impedance mismatch between a signal generator generating the analog reference signal and the device under test is corrected.

12. The signal processing method according to claim 1, wherein an impedance mismatch between a signal generator generating the analog reference signal and the second measurement circuit is corrected.

13. A measurement system comprising circuitry configured to perform the signal processing method according to claim 1.

14. The measurement system of claim 13, wherein the circuitry includes a first measurement circuit, a second measurement circuit, a first noise reduction circuit, a second noise-reduction circuit, and a subtraction circuit, and wherein the first measurement circuit, the second measurement circuit, the first noise reduction circuit, the second noise reduction circuit, and the subtraction circuit are integrated into a measurement instrument.

15. The measurement system of claim 14, wherein the measurement instrument is established as an oscilloscope, as a digital oscilloscope, as a signal analyzer, as vector network analyzer, or as a measurement receiver.

16. The measurement system according to claim 13, further comprising an external signal generator, wherein the external signal generator is configured to generate the analog reference signal.

17. The measurement system of claim 16, wherein the external signal generator is configured to generate the analog reference signal based on a digital waveform.

* * * * *